US011302114B2

United States Patent
Csillag et al.

(10) Patent No.: US 11,302,114 B2
(45) Date of Patent: Apr. 12, 2022

(54) PARAMETER TRAINING METHOD FOR A CONVOLUTIONAL NEURAL NETWORK AND METHOD FOR DETECTING ITEMS OF INTEREST VISIBLE IN AN IMAGE AND FOR ASSOCIATING ITEMS OF INTEREST VISIBLE IN AN IMAGE

(71) Applicant: Idemia Identity & Security France, Courbevoie (FR)

(72) Inventors: Dora Csillag, Courbevoie (FR); Cécile Jourdas, Courbevoie (FR); Maxime Thiebaut, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 208 days.

(21) Appl. No.: 16/590,780

(22) Filed: Oct. 2, 2019

(65) Prior Publication Data
US 2020/0110926 A1 Apr. 9, 2020

(30) Foreign Application Priority Data

Oct. 3, 2018 (FR) ...................................... 1859162

(51) Int. Cl.
*G06K 9/00* (2022.01)
*G06K 9/32* (2006.01)
(Continued)

(52) U.S. Cl.
CPC ............ *G06V 40/166* (2022.01); *G06F 16/51* (2019.01); *G06F 17/15* (2013.01); *G06F 17/16* (2013.01);
(Continued)

(58) Field of Classification Search
CPC ............ G06K 9/00255; G06K 9/3258; G06K 2209/15; G06F 16/51; G06F 17/15; G06F 17/16; G06N 3/08
See application file for complete search history.

(56) References Cited

U.S. PATENT DOCUMENTS

2019/0392587 A1* 12/2019 Nowozin ............. G06N 3/0454
2020/0074148 A1* 3/2020 Xu ..................... G06K 9/00308

OTHER PUBLICATIONS

International Search Report and Written Opinion of the French National Institute of Industrial Property (INPI) for FR1859162 dated Jul. 15, 2019.
(Continued)

*Primary Examiner* — David F Dunphy
(74) *Attorney, Agent, or Firm* — Womble Bond Dickinson (US) LLP

(57) ABSTRACT

This invention concerns a method of learning parameters of a convolutional neural network (CNN) through data processing means (11a, 11b, 11c) of at least one server (1a, 1b, 1c), for detecting items of interest visible in images, from at least one image learning database in which said items of interest, as well as characteristic geometric structures are already annotated, the CNN comprising an encoding layer for generating a representation vector of the detected items of interest, the method being characterized in that said representation vector comprises, for at least a first item of interest category to be detected, at least one descriptive value of at least a characteristic geometric structure of said first item of interest category.
The present invention also relates to a process for detecting items of interest visible in an image and a method for associating items of interest visible in an image.

14 Claims, 6 Drawing Sheets

(51) Int. Cl.
*G06N 3/08* (2006.01)
*G06F 17/16* (2006.01)
*G06F 17/15* (2006.01)
*G06V 40/16* (2022.01)
*G06F 16/51* (2019.01)
*G06V 20/62* (2022.01)

(52) U.S. Cl.
CPC ............... *G06N 3/08* (2013.01); *G06V 20/63* (2022.01); *G06V 20/625* (2022.01)

(56) References Cited

OTHER PUBLICATIONS

Zhang, K.-P., Zhang, Z.-P., Li, Z., Qiao, Y., 'Joint Face Detection and Alignment using Multi-task Cascaded Convolutional Networks', IEEE Signal Processing Letters, 23(10), pp. 1499-1503. doi: 10.1109/lsp.2016.2603342.

Tang, X., Du, D.K., He, Z., Liu, J., 'PyramidBox: A Context-Assisted Single Shot Face Detector', Computer Vision—ECCV 2018 Lecture Notes in Computer Science, pp. 812-828 doi: 10.1007/978-3-030-01240-3_49.

Dai, X., Southall, B., Trinh, N., Matei, B., 'Efficient Fine-grained Classification and Part Localization Using One Compact Network', 2017 IEEE International Conference on Computer Vision Workshops (ICCVW), pp. 996-1004, doi: 10.1109/iccvw.2017.122. pp. 996-1004.

* cited by examiner

| Type | Filters | Size/Stride | Output |
|---|---|---|---|
| Convolutional | 32 | 3 × 3 | 224 × 224 |
| Maxpool | | 2 × 2/2 | 112 × 112 |
| Convolutional | 64 | 3 × 3 | 112 × 112 |
| Maxpool | | 2 × 2/2 | 56 × 56 |
| Convolutional | 128 | 3 × 3 | 56 × 56 |
| Convolutional | 64 | 1 × 1 | 56 × 56 |
| Convolutional | 128 | 3 × 3 | 56 × 56 |
| Maxpool | | 2 × 2/2 | 28 × 28 |
| Convolutional | 256 | 3 × 3 | 28 × 28 |
| Convolutional | 128 | 1 × 1 | 28 × 28 |
| Convolutional | 256 | 3 × 3 | 28 × 28 |
| Maxpool | | 2 × 2/2 | 14 × 14 |
| Convolutional | 512 | 3 × 3 | 14 × 14 |
| Convolutional | 256 | 1 × 1 | 14 × 14 |
| Convolutional | 512 | 3 × 3 | 14 × 14 |
| Convolutional | 256 | 1 × 1 | 14 × 14 |
| Convolutional | 512 | 3 × 3 | 14 × 14 |
| Maxpool | | 2 × 2/2 | 7 × 7 |
| Convolutional | 1024 | 3 × 3 | 7 × 7 |
| Convolutional | 512 | 1 × 1 | 7 × 7 |
| Convolutional | 1024 | 3 × 3 | 7 × 7 |
| Convolutional | 512 | 1 × 1 | 7 × 7 |
| Convolutional | 1024 | 3 × 3 | 7 × 7 |
| Convolutional | 1000 | 1 × 1 | 7 × 7 |
| Avgpool | | Overall | 1000 |
| Softmax | | | |

FIG. 4

PARAMETER TRAINING METHOD FOR A CONVOLUTIONAL NEURAL NETWORK AND METHOD FOR DETECTING ITEMS OF INTEREST VISIBLE IN AN IMAGE AND FOR ASSOCIATING ITEMS OF INTEREST VISIBLE IN AN IMAGE

CROSS-REFERENCE TO RELATED APPLICATIONS

This application claims the benefit of French Patent Application No. 1859162 filed Oct. 3, 2018, the disclosure of which is herein incorporated by reference in its entirety.

GENERAL TECHNICAL FIELD

The present invention relates to the field of supervised training, and in particular a method of learning parameters of a convolutional neural network, a method of detecting items of interest visible in an image by means of a convolutional neural network and a method of associating items of interest visible in an image.

STATE OF THE ART

Neural networks are massively used for data classification.

During an automatic training phase (generally supervised, meaning on an already classified reference database), a neural network "learns" and becomes capable on its own of applying the same classification to unknown data.

Convolutional neural networks (CNN) are a type of neural network in which the connection pattern between neurons is inspired by the visual cortex of animals. They are thus particularly suited to a specific type of task, namely image analysis, as they effectively allow the recognition of items of interest such as objects or people in images, particularly in security applications (automatic surveillance, threat detection, etc.). To do this, the CNN is learned on an image learning basis, i.e. images in which the items of interest have already been "annotated", i.e. highlighted and labeled with the corresponding item category.

We are particularly aware of the use of CNNs to do what is called "tracking", i.e. the temporal tracking of these items of interest, such as people or objects.

More precisely, the objective is to analyze a sequence of successive images (typically frames of a video, for example acquired by a surveillance camera) and identify the same item present in several images in order to follow its movement. Each identified item (e. g. each face) is assigned a unique identifier (typically an integer) common to all frames. Thus, for example, one can recognize a suspect by his/her face and follow his/her movement in a crowd from one person to another.

Today, these techniques are satisfactory but there is still room for improvement. In particular, there is a problem of "association" between them related with items when one is a subpart of the other. For example, it seems obvious that each person is uniquely and permanently associated with a face, or similarly that each vehicle is uniquely and permanently associated with a license plate, but this link is sometimes difficult to maintain.

A first intuition is indeed to start from the principle (in the face/person example) that a face detection must be included in the person's box, and therefore, associate a face with a person detection that contains this face detection.

This solution is not reliable, since a detection of a pedestrian (the encompassing box) may "contain" several faces, depending on the context and the disposition of the people. For example, in reference to FIGS. 1a-1b (which represent two successive frames of the same scene), an adult may be holding a baby in his/her arms, and therefore, the adult's box will then contain two close face detections.

Thus, on the one hand, the algorithm does not know which one to associate with person detection, and on the other hand, this association can be disrupted over time. In the example in FIG. 1a, the correct face is associated with the correct person under the identifier 308 and the baby's face with the identifier 311, but when the baby's nose enters the baby's face box (case in FIG. 1b), there is a change in the person-face association: the baby's face is assigned the adult's identifier 308 while the adult's face no longer has an associate and is assigned the new identifier 316. Even if the association is restored a few images further on, we find ourselves with more identifiers created than real items (we no longer know which association to believe), which distorts the whole tracking.

Therefore, it would be desirable to have a new solution for associating an item with a sub-part of that item that is simple, reliable and universal, without additional calculation time.

BRIEF DESCRIPTION OF THE INVENTION

According to a first aspect, this invention relates to a method of learning parameters of a convolutional neural network (CNN) through data processing means of at least one server, for detecting items of interest visible in images, from at least one image learning database in which said items of interest, as well as characteristic geometric structures are already annotated, the CNN comprising an encoding layer for generating a representation vector of the detected items of interest, the method being characterized in that said representation vector comprises, for at least a first item of interest category to be detected, at least a descriptive value of at least a characteristic geometric structure of said first item of interest category.

According to other advantageous and nonlimiting characteristics:

said representation vector comprises two position values and a visibility value of the at least one characteristic geometric structure of said given item of interest category;

said characteristic geometric structure is a keypoint;

said representation vector includes descriptive values of at least three characteristic geometric structures of said first item of interest category;

which the encoding layer is a convolution layer with 1×1 size filters or a fully connected layer;

the method is implemented from a plurality of image learning databases in which said items of interest are already annotated, the CNN being common to said plurality of image learning databases and having a common core and plurality of encoding layers, each specific to one of said plurality of image learning databases;

each image learning database is associated with a set of item of interest categories, the items of interest detected in the images of a database being those belonging to a category of said set associated with the database, said sets of categories being different from one database to another;

said plurality of image learning databases includes at least a first database, a second database and a third database, the set of item of interest categories associated with the first database including the face category, the set of item of interest categories associated with the second database including the person category, and the set of item of interest categories associated with the third database including the vehicle category or at least one subcategory of the vehicle category.

According to a second aspect, the invention concerns a method of detecting items of interest visible in an image, by means of terminal data processing, by means of a CNN learned in accordance with the method according to the first aspect, wherein the items of interest of said first category are detected, as well as for each item of interest of the first detected category, the characteristic geometric structures of said first item of interest category, visible in said image.

According to advantageous and non-limitative characteristics:

the method further comprises detecting items of interest of a second category different from the first category, such that the second category is a subpart of the first category, and such that the characteristic geometric structures of the first item of interest category are also characteristic geometric structures of the second item of interest category;

either the second category is the face category and the first category is the person category, or the second category is the license plate category and the first category is the vehicle category or a subcategory of the vehicle category.

According to a third aspect, the invention relates to a process for associating items of interest visible in an image, characterized in that it comprises the implementation by data processing means of equipment of steps of:

(a) Detection of at least one item of interest of a first visible category in said image and at least one item of interest of a second category different from the first visible category in said image, in accordance with the detection method according to the second aspect;

(b) Association of each item of interest of the first detected category with an item of interest of the second detected category.

According to other advantageous and nonlimiting characteristics:

step (a) further comprises detecting, for each item of interest of the first detected category, the characteristic geometric structure or structures of said first item of interest category, visible in said image;

the method comprises a step (b) of calculating, for each pair of a first item of interest of the first detected category and of a second item of interest of the second detected category, a recovery score between a box of said second item and the characteristic geometric structure(s) of said first item of interest category for the first item;

step (c) is performed using a combinatorial optimization algorithm based on the calculated recovery scores;

said representation vector comprises descriptive values of at least three keypoints of said first item of interest category, so as to detect in step (a), for each item of interest of the first detected category, at least three characteristic geometric structures of said first item of interest category visible in said image;

said overlap score between a box of said second item and the keypoint(s) of said first item of interest category for the first item calculated in step (b) is an overlap rate, in particular the Jaccard criterion, between said box of the second item and a convex envelope of the characteristic geometric structures of said first item of interest category for the first item;

two associated items of interest are considered to be part of the same entity;

said combinatorial optimization algorithm is the Hungarian algorithm.

According to a fourth and fifth aspect, the invention proposes a computer program product including code instructions for executing a method according to the first, second or third aspect of learning parameters of a convolution neural network, CNN, detecting items of interest visible in an image or associating items of interest visible in an image; and a storage medium readable by computer equipment on which a computer program product includes code instructions for executing a method according to the first, second or third aspect of learning parameters of a convolution neural network, CNN, detecting items of interest visible in an image or associating items of interest visible in an image.

DESCRIPTION OF THE FIGURES

Other characteristics and advantages of the present invention will appear upon reading the following description of a preferred embodiment. This description will be given with reference to the attached drawings in which:

FIG. 4 represents an example of a CNN architecture for the implementation of a method for carrying out a process for detecting the invention;

DETAILED DESCRIPTION

Concepts

Figure 3:
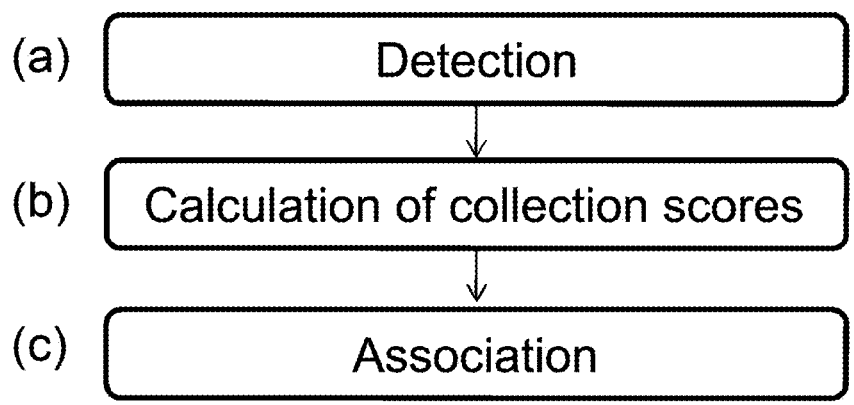
FIG. 3 illustrates the steps of a preferred method of performing the follow-up process according to the invention.

With reference to FIG. 3, which will be described below, according to several complementary aspects, the present invention may involve:

- a learning process for a convolution neural network (CNN);
- a method of detecting items of interest visible in an image;
- a process for associating items of interest visible in an image;
- a process for tracking items of interest visible in a video consisting of a sequence of K images (i.e. frames).

Here, the term "item of interest" refers to any representation in the image/video of an entity, whose detection/association/tracking in an image/video is desired. Each item of interest is of a given category, corresponding to a type in the semantic sense. For example, categories such as person, face, vehicle, registration plate, etc. can be considered: vehicle category covers all vehicles (car/truck/bus . . . ) regardless of model, color, etc., the registration plate category covers all plates regardless of the country/region of emission, color, etc.

"Detection", or "recognition", is the most basic operation, and refers to the simple marking of an item of interest of a known category in an image. Detection thus combines localization (determination of the position and size of a box including the item of interest, known as the detection box) and classification (determination of its category).

By "tracking", we mean, as explained before, the "tracking" of these items of interest during the duration of the video, i.e. the continuous identification of the same detected item from image to image where it is present in order to determine the movement of the corresponding entity over time.

To do this, each item of interest is referenced with an identifier, all occurrences of an item of interest for a given identifier being called a track.

We will distinguish between "detection" and "identification": whereas detection is done frame by frame, and does not distinguish between the different items of the same category, identification assigns the right identifiers to the detections so that two detections of the same entity on two different images have the same identifier, i.e. are part of the same track. For example, assuming that on a first image two person category items are identified as "person 1" and "person 2" and that two person category items are detected in a second image again, the identification makes it possible to determine in the second image which is person 1 or 2 (or even person 3).

Identification can, in other words, be seen as the correspondence of a detected item to an entity, i.e. the distinction between different items of the same category detectable in one or more images.

It is understood that in a "perfect" tracking, an entity should be uniquely and consistently identified by the same item of interest, i.e. there should be an exact correspondence between an item of interest and an entity but, in practice, an entity can be associated over time with several items of interest (constituting duplicates), or an item of interest can change entity (confusion of two entities); see below. These are tracking inaccuracies that this process effectively resolves.

"Association" refers to the correspondence or matching of two items of interest of different, but related, categories.

Figure 1A:
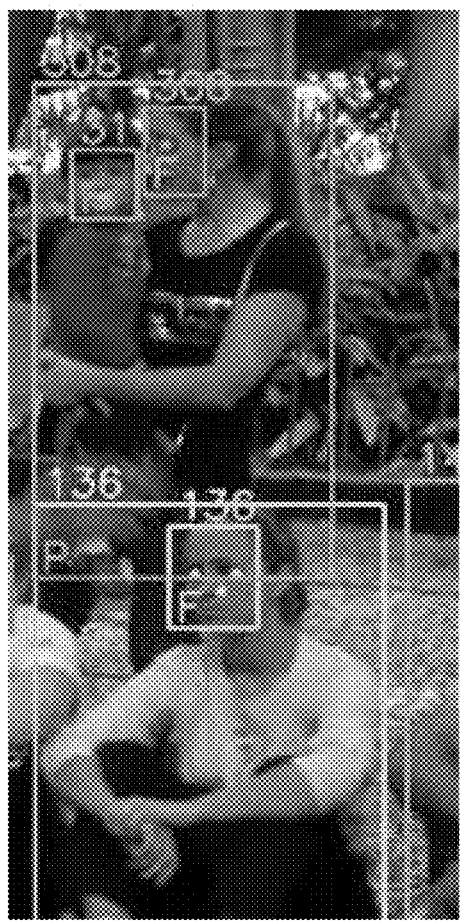
FIGS. 1a and 1b represent two examples of the association of items of interest in video images using a known process.
Figure 1B:
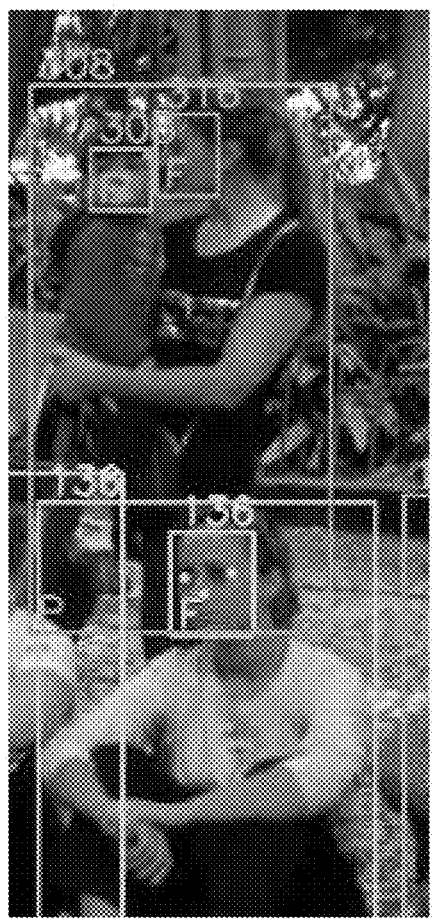

A first item of interest of a first category and a second item of interest of a second category may be associated if they are related, particularly if they are part of the same entity. In general, two items of interest of different associated categories are referenced by the same identifier, i.e. there is one unique identifier per entity, as in the examples in FIGS. 1a, 1b.

In the following part of the description, we will consider the preferred embodiment of an association of a "subpart" nature. In other words, one item of interest of the first and second item of interest categories is a subpart of the other, i.e. part of it. Arbitrarily, this description considers the second category as a subpart of the first category, but the opposite can naturally be considered. According to an example, the second category is the face category and the first category is the person category. According to another example, the second category is the license plate category and the first category is the vehicle category.

It should be noted that the invention will not be limited to an association of a subpart nature, and it may for example be considered an association of two categories which are themselves subparts of a third category (for example, a face-hand association).

One can even consider cases of association where there is no part/sub-part relationship, either directly or indirectly; for example person and luggage.

In a case where there are more than two item of interest categories that can be associated (e.g., person/face/hand), in particular a first category, a second category and a third category, simply define a main category (the "part") and secondary categories (the "sub-parts"), and associate each secondary category with the main category. For example, if there is a person/face/hand association, each hand will be associated with a person and each face will be associated with a person, but no attempt will be made to associate the hands and faces (as long as this association is known by transitivity from the other two).

Figure 2:
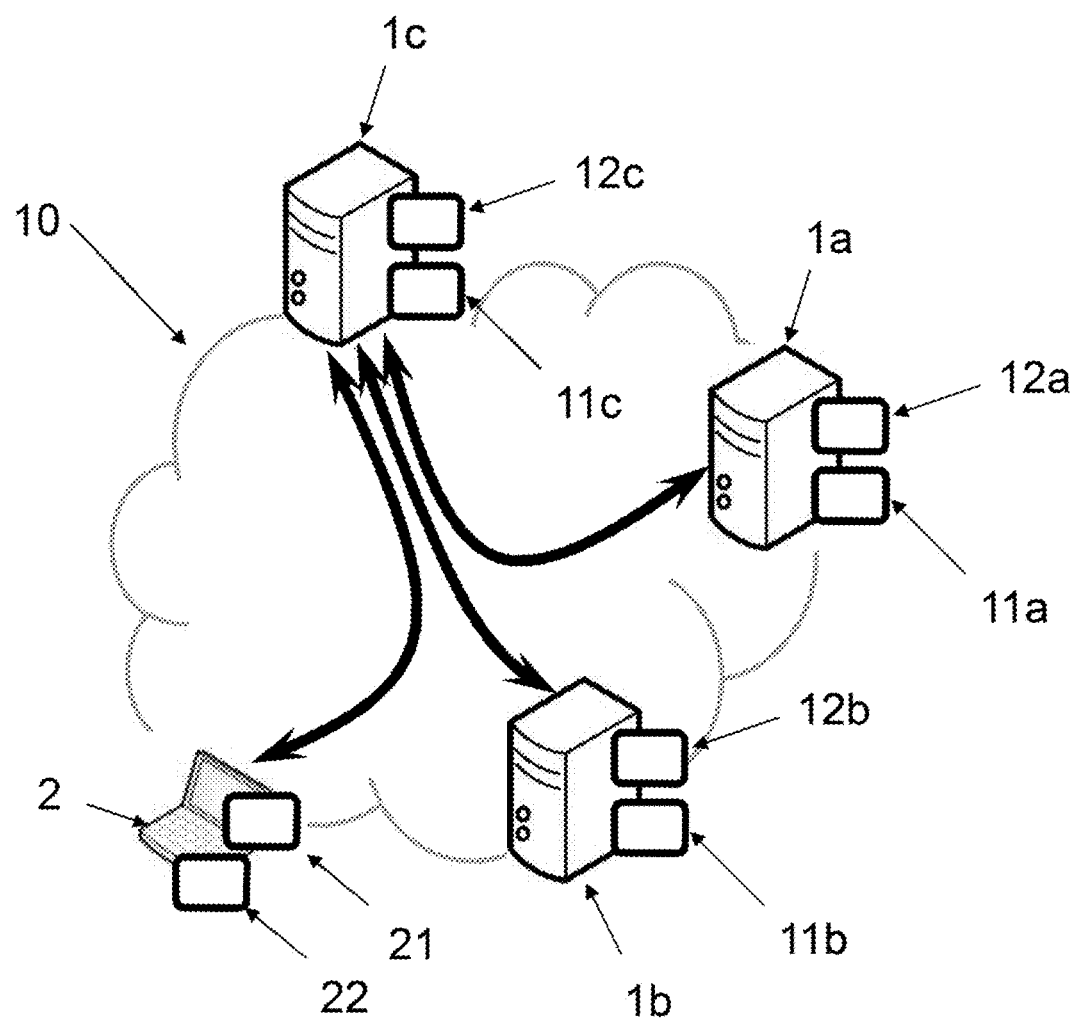
FIG. 2 is a diagram of an architecture for implementation of the methods according to the invention.

The present methods are implemented within an architecture such as shown by FIG. 2, thanks to one or more servers 1a, 1b, 1c, and a terminal 2. As we will see, the process may include the learning of one or more convolution neural networks, CNN, and if necessary the server(s) 1a, 1b, 1c are associated learning devices. The terminal 2 is strictly speaking a user equipment, i.e. one that implements all or part of this process), for example a video surveillance data processing equipment.

In any case, each device 1a, 1b, 1c, 2 is typically remote computer equipment connected to an extended network 10 such as the Internet for the exchange of data. Each comprises data processing means 11a, 11b, 11c, 21 of processor type and data storage means 12a, 12b, 12c, 22 such as computer memory, for example a drive.

At least one of the possible servers 1a, 1b, 1c stores a learning database, i.e. a set of learning images, on which items of interest have already been annotated with the corresponding item category (as opposed to the so-called input video on which we are trying to track). Preferably, we have at least two, or even at least three, image learning databases, stored on as many separate servers (example of the two servers 1a and 1b in FIG. 2).

In FIG. 2, server 1c is an optional server that does not have an image learning database and implements the obtaining of the CNN(s) from the databases of servers 1a, 1b. However, the role of this server 1c can be accomplished by either of the servers 1a, 1b.

CNN

A CNN generally comprises four types of layers successively processing information:
  the convolution layer which processes blocks from the input one after the other;
  the nonlinear layer with which to add nonlinearity to the network and therefore to have much more complex decision functions;
  the pooling layer with which to combine several neurons into a single neuron;
  The fully connected layer which connects all the neurons from one layer to all the neurons of the preceding layer.

The non-linear layer NL activation function is typically the ReLU function (Rectified Linear Unit) which is equal to $f(x)=\max(0, x)$ and the most used pooling layer (labeled POOL) is the function MaxPool2×2 which corresponds to a maximum between four values of a square (four values are pooled into one).

The convolution layer, labeled CONV, and the fully connected layer, labeled FC, generally correspond to a scalar product between the neurons of the preceding layer and the weight from the CNN.

Typical CNN architectures stack several pairs of CONV→NL layers and then add a POOL layer and repeat this plan [(CONV→NL)$^P$→POOL] until getting a sufficiently small size output factor, and then ending by one or two fully connected FC layers.

In image analysis, there are not always non-linear NL layers or even fully connected FC layers.

The person skilled in the art may, for example, refer to the CNNs described in documents YOLO9000: Better, Faster, Stronger—Joseph Redmon, Ali Farhadi, https://arxiv.org/abs/1612.08242, Faster R-CNN: Towards Real-Time Object Detection with Region Proposal Networks, https://arxiv.org/abs/1506.01497, or their derivatives.

In the rest of this description, we will take in particular an example of a CNN based on the "Darknet-19" architecture shown in FIG. 4 and described in document YOLO9000, which includes 19 CONV convolution layers, 5 Max-Pool2×2 pooling layers (Alternatively, we can also mention the "Darknet-53" version, with 53 CONV convolution layers, or any architecture of the type VGG, RESNET, DENSNET, etc.).

Using the example of the Darknet-19, it will be possible to build a detection CNN by taking its common core (i.e. the part extending to the double horizontal line in FIG. 4) and possibly adding three convolution layers with 1024 3×3 filters, and especially a last CONV convolution layer advantageously fitted with 1×1 filters, which acts as a so-called "encoding layer" and has an output of size C (i.e. has a number of filters equal to the desired size of the output representation vector; see below). Alternatively, a fully connected FC layer can be used as an encoding layer.

Indeed, the purpose of a CNN-based method is to describe as precisely and repeatedly as possible the content of an image in the form of a vector containing all the information of the items to be detected; this is what the encoding layer allows. Thus, the encoding layer generates a vector for representing the detected items of interest.

The image is spatially divided into S cells (for example 7×7 cells), each cell has B "description boxes" (typically, B=2 or 3), which indicate the presence of one or more items of interest (up to B items) in this cell, and thus constitute "candidate" detection boxes. The right detection box is the one that best encompasses (i.e. closest) the corresponding item of interest.

The presence of an entity in a description box results at least in the data of its position in the cell and its category, encoded in the form of the vector called "representation" of C values generated by the encoding layer. Generally, the vector contains at least five values:

x/y coordinates of the center of the description box (as a fraction of the cell size);
Length/width w/h of the description box (as a fraction of the cell size);
Identifier c of the item of interest category.

The total description code of an image is the concatenation of all the representation vectors of the description boxes, i.e. of length S*B*C.

Figure 6A:
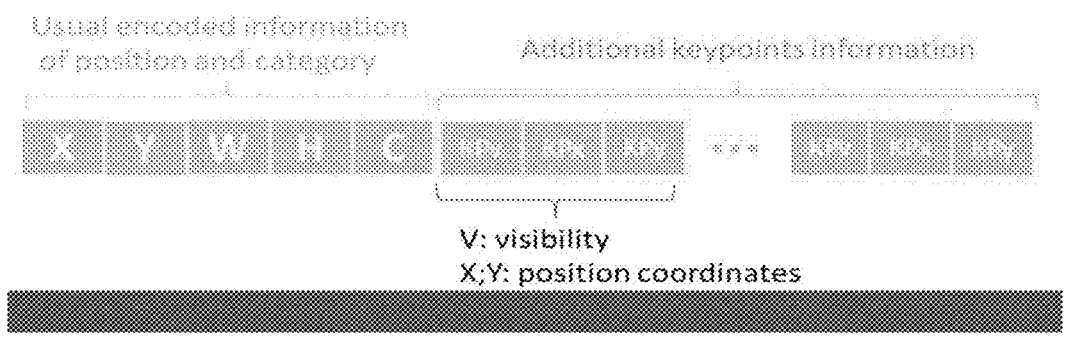
FIG. 6a represents an example of a representation vector generated when implementing an association process according to a preferred embodiment of the invention.

With reference to FIG. 6a, at least some representation vectors (those for an item of interest in a given category, e.g. persons) are elongated, i.e. are concatenated with descriptive values of at least one characteristic geometric structure of said category, in particular said descriptive values advantageously include at least two position values (coordinates KPx/KPy) and/or a visibility value (boolean value KPv). In a particularly preferred way, there are at least three characteristic geometric structures, i.e. at least nine additional descriptive values, as discussed below.

Thus, the detection of keypoints is carried out simultaneously with the detection of the items of interest, without additional time and without performance degradation.

By "characteristic geometric structure", we mean, in particular, a "keypoint", but also a shape such as a polygon, a mesh, etc. and in general any graphic object easily identifiable on all the items of this category. In a particularly preferred way, when one of the first and second categories is a subpart of the other, characteristic geometric structures common to the first and second categories are chosen. In the face/person example, we can take both eyes and nose for example: indeed, they are geometric structures of a very particular shape, characteristic of both a person and a face.

The use of these "common" characteristic geometric structures makes it very cleverly possible to associate items of two categories in the image, as we will see later on, in a very reliable way.

In the following part of the description, we will take the example in which the geometric structures are points, and for example we will consider the eyes or the nose of a face as keypoints.

It is advantageous to encode other information on this code on the representation vector (other enclosing boxes, information on the current action, a vehicle license plate number, etc.).

Learning Process

According to a first aspect, the invention relates to a method for learning parameters of at least one convolution neural network (CNN) for detecting visible items in images, from at least one image learning database in which said items are already annotated, i.e. located and classified (the category is determined). Each image database is in fact advantageously associated with a set of item of interest categories, the items of interest annotated in the images of a database, being those belonging to a category of said set of categories associated with the database. In particular, the focus is on identifying items of interest in at least two categories, a first category and a second category.

As explained before, for the items of at least one given category may already be annotated one or more characteristic geometric structures, i.e. their known coordinates in the image. It is understood that characteristic geometric structures are not always visible and are therefore only acknowledged if visible. For example, a person's profile can be detected as a person category item (also his face), but his left or right eye will not be visible for being on the other side of the head.

The characteristic geometric structures annotated are advantageously those of at least one given category (the first category).

As explained before, at least one CNN then comprises an encoding layer for generating a vector for representing the items of interest to be detected comprising, for at least said first item of interest category to be detected, at least one (advantageously three, in particular coordinates and visibility) descriptive value of at least one (advantageously three) geometric structure characteristic (in particular keypoint) of said first item of interest category. It will be understood again that not all characteristic geometric structures are necessarily visible and that of course only those that are can be detected. Thus, even if we try to detect three keypoints, we will not necessarily be able to do so for all three (but we will then indicate the one or ones that are not visible).

According to a first standard mode, each CNN is learned from a single learning database, for a subset of all categories associated with this database (or even a single category, and in particular the first or second category). In other words, it learns to recognize one or more of the item categories already annotated in the image learning database.

It is not possible to merge two learning databases because they are "partially" annotated with respect to each other. For example, if we consider a people database and a vehicle database, the vehicles are not annotated in the people database and vice versa, which are false negatives that would completely disrupt the learning process. Missing records would have to be manually added, which is a titanic task. One example is the MS-COCO database (the most widely used) which contains only records of people, some animals and some objects, but no record of faces. Another example is the WIDER database, which contains only face annotations.

Moreover, if one of the first and second item of interest categories is a sub-part of the other, even by creating an ad hoc basis, it would not be possible to simultaneously teach a CNN to detect both categories because of their inclusion.

Thus, in a case the first category is in the set of categories of a first database and the second category is in the set of categories of a second database, we learn two CNNs that constitute two independent "detectors".

For example, one can learn on one side a detector of person category items from a first database associated with a set of item of interest categories including the person category and having the characteristic geometric structures of the person category annotated (typically directly by the processing means $11a$ of the first server $1a$ if it is the one recording in the first database), and on the other side a face category item detector from a second database associated with a set of item of interest categories including the face category, this time without characteristic geometric structures (typically directly by the processing means $11b$ of the second server $1b$ if it is the one storing the second database).

Note that limiting the number of different categories detectable by a CNN reduces the necessary size of the output representation vector.

According to a second preferred embodiment, the problem of incompatibility of the different databases is avoided by allowing at least one common CNN to be learned directly from a plurality of image learning databases in a single learning process. This is advantageously achieved by the data processing means $11c$ of server $1c$ connected to the other servers $1a$, $1b$ of the databases. Said CNN is said to be "common" to several databases (in other words, there is only one CNN learning from several databases at a time), as opposed to conventional CNNs, which can only learn from one database each.

Figure 5:
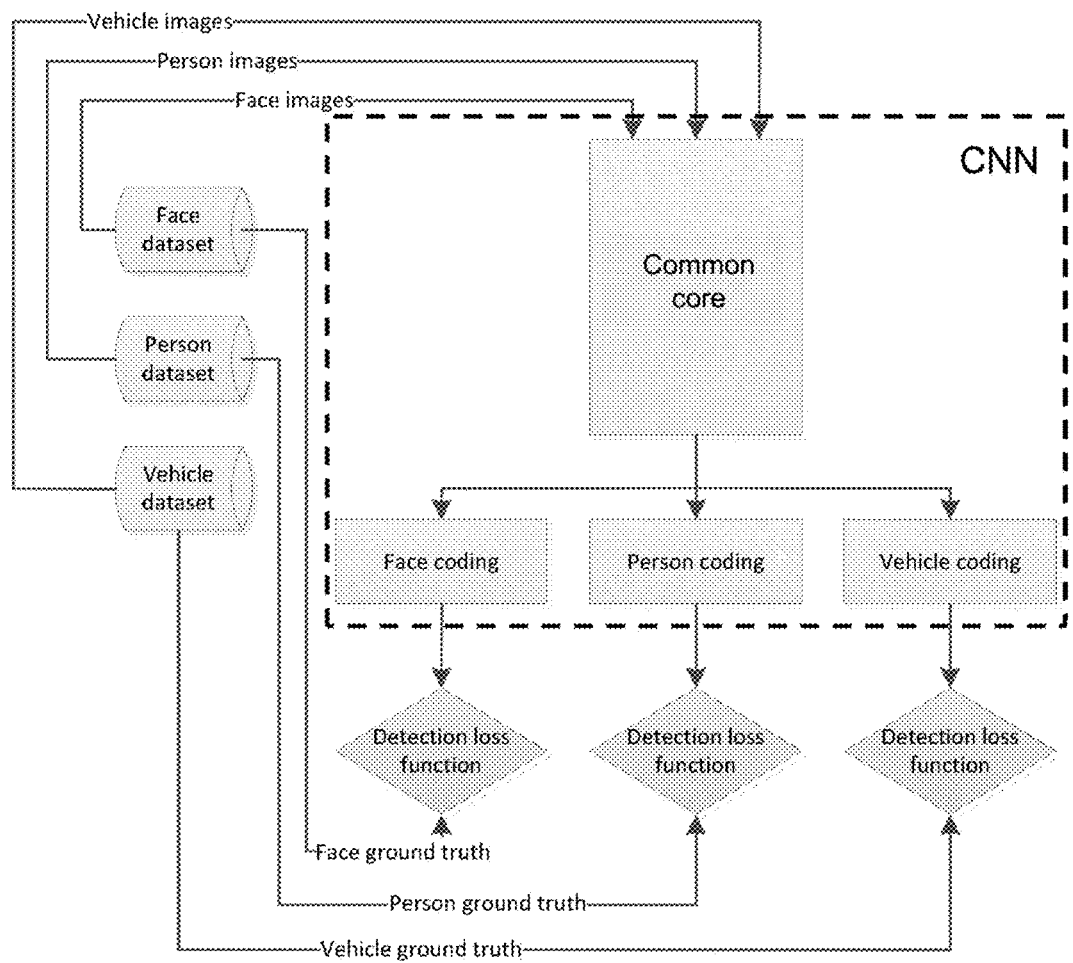
FIG. 5 schematically illustrates the implementation of a learning process according to a preferred method of performing the invention.

With reference to FIG. 5, said plurality of image learning databases advantageously comprises at least a first image learning database (in which at least the items of interest of the first category, as well as for each item of interest of the first category the characteristic geometric structures of the first category, are already annotated) and a second database (in which at least the items of interest of the second category are already annotated), or a third database.

In particular, the set of item of interest categories associated with the first database includes the person category (the first category in the examples), the set of item of interest categories associated with the second database includes the face category (the second category), and the set of item of interest categories associated with the potential third database includes one or more categories of inanimate objects, such as the vehicle category or at least one vehicle subcategory (for example, the seven categories car, truck, bus, two wheel, bicycle, plane and boat). However, we understand that we are not limited to any choice of databases/categories.

For this purpose, a CNN having a common core and a plurality of encoding layers each specific to one of said plurality of image learning databases is used as a common CNN.

In other words, as shown in FIG. 5, the CNN architecture does not have an encoding layer common to all modalities (i.e. the different sets of categories), but an encoding layer specific to some of the modalities.

In a particularly preferred way, said common core includes all layers with variable parameters other than the encoding layer, and in particular the beginning of the beginning. In the example in FIG. 4, the common core extends to the double horizontal line.

In other words, assuming that we have three image learning databases as in the example in FIG. 5, then we have three encoding layers and for each input learning image we use the encoding layer corresponding to the database from which the learning image comes.

It is therefore understood that all learning images participate in the learning of the common core, but that only images from a database participate in the learning of each encoding layer.

The various encoding layers are, as explained, each advantageously composed of a convolution layer with preferably 1×1 size filters, and whose output size C (the number of filters) corresponds to the size of the representation vector (typically 8 for people and faces, and 14 for vehicles if there are 7 subcategories as in the example above, plus said descriptive values of at least one geometric structure characteristic for at least one of them). The various encoding layers are typically arranged in parallel.

In addition, a plurality of cost functions, each specific to one of said plurality of image learning databases, are advantageously used as shown in FIG. 5.

It should be recalled that a cost function (known as a "loss" function) specifies how learning the CNN penalizes the difference between the expected and actual signal. More precisely, for an input data (learning image), the cost function allows to quantify an "error" between the output obtained by the CNN (the detected items) and the theoretical output (the annotated items). The learning aims to modify the CNN parameters in order to gradually reduce the error as calculated by the cost function. For example, we know the Softmax function (or normalized exponential function), or the Huber function, standards such as the L1 standard, etc.

To achieve the learning itself, the standard technique known as back-propagation of the gradient propagates the calculated error "backwards" so as to update the parameters of all layers.

In this embodiment, this is done using different cost functions depending on the basis from which each learning image comes. More precisely, learning images are randomly iteratively taken from the database plurality (i.e. each image can be from any database), and the weights and parameters of the CNN vary for each databased on the cost function corresponding to the database from which it comes.

In a particularly preferred way, we implement a learning paradigm called "batch", that is to say that for a set of learning images coming from different databases, we first calculate the errors (with the corresponding cost function) without updating the parameters, then we add these different errors, and when all the images of the said set have passed once in the CNN, we apply back-propagation throughout the CNN using the total error (sum).

The common CNN can be used as a "multi-category" detector when applied to video images. Of course it is already possible to make multi-category detectors from a single database if it already has the items of several annotated categories, but we are limited to these categories. The common CNN of this embodiment allows to combine any learning databases, and therefore to be multi-category in a completely free way.

It is understandable that multiplying the encoding layers and cost functions makes it possible, without significantly increasing the size of the network, not to have one detection penalized by another and to have the same efficiency as with a plurality of detectors. In addition, there is a significant time saving in learning since it can be simultaneous for all the databases.

It should be noted that it is still quite possible, if one wishes to detect a large number of different categories, to learn from other CNNs, whether they are each common to several databases or specific to a database. For example, one could have a first common CNN multi-category detector, and a second CNN detector dedicated to another complex category to be identified and learned from a particular database.

Detection

According to a second aspect a method of detecting items of interest visible in an image (input, as opposed to learning images), by data processing means 21 of the terminal 2, using a CNN learned according to the method according to the first aspect is proposed.

This detection method comprises two steps: in a first step, the learning of a CNN as defined above is implemented, and in a second step, the data processing means 21 of the terminal 2 processes the said image, by means of this CNN, in order to detect the item or items of interest that are visible therein.

At least the items of interest of said first category are detected, as well as for each item of interest of the first category detected the characteristic geometric structures of said first item of interest category, visible in said image, and preferably the items of interest of said second category.

This method is implemented in a standard way, we understand just as explained that the detection includes that of characteristic geometric structures thanks to the elongated representation vector.

Association

According to a third aspect a method for associating items of interest visible in an image, implemented by the data processing means 21 of the Terminal 2 is proposed.

With reference to FIG. 3, in a first step (a), the detection of at least one item of interest of a first category and at least one item of interest of a second category different from the first category visible in said image is carried out in accordance with the detection method according to the second aspect.

In a step (c) (we will see later that an optional step (b) can take place before), each item of interest of the first category detected in said image is associated with an item of interest of the second category detected in said image.

It is recalled that two associated items are considered to be related to, and in particular part of, the same entity, as explained above.

Note that it is always possible that there may still be an item of the first or second "orphan" category if there is not the same number of items of the first and second category that have been detected, i.e. if for example the one with which an item should have been associated is hidden or the detection did not work. For example, in FIG. 1a, the baby is not detected (only his face is) and therefore we have an orphan face.

Each item of interest is advantageously referenced by an identifier, and in a preferred way the association of two items is translated by associating to the second the identifier of the first (i.e. both are referenced under the same identifier).

Step (c) can be implemented in a standard way (typically by detecting the inclusion of a second item in the first item), but in a particularly preferred way, an innovative process of associating items of interest in an image, involving the elongated representation vector CNN described above, will be used.

In this embodiment, in step (a) is detected as explained at least one item of interest of a first category, at least one item of interest of a second category different from the first, as well as for each item of interest of the first category detected the characteristic geometric structure(s) of said first item of interest category (i.e. the characteristic geometric structure(s) associated with each item of the first category), visible in said image.

These are chosen such that the second category is a subpart of the first category, and that the characteristic geometric structures of the first item of interest category are also characteristic geometric structures of the second item of interest category. As already explained, this is the case, for example, for facial features such as the nose and eyes.

Then, in a step (b), for each pair of a first item of interest of the first detected category and a second item of interest of the second detected category, a recovery score is calculated between a box of said second item and the characteristic geometric structure or structures of said first item of interest category for the first item.

The clever idea is not to directly compare the items of the first category and the items of the second category, but, based on the principle that the second category is a subpart of the first category and that the characteristic geometric structures of the first item of interest category also are characteristic geometric structures of the second item of interest category, to compare directly the characteristic geometric structures of the first category with the items of the second category: the characteristic geometric structures can be seen as a "second detection" of an item of the second category, which is easily put into correspondence with it.

By "overlap score", we mean any metric representative of the correspondence between a box and characteristic geometric structures, i.e. increasing when the characteristic geometric structures are more and more included in the box.

According to a first embodiment, the overlap score of a pair of a first item with a second item can simply be equal to the number of characteristic geometric structures for the first item that are included in the box of the second item (possibly standardized by dividing by the total number of characteristic geometric structures). For example, in the example in FIG. 1b, we have a ⅓ overlap score with each of the mother's and child's faces since each of the corresponding boxes includes a point characteristic of the mother (in this case the nose or left eye, the right eye not being visible).

Figure 6B:
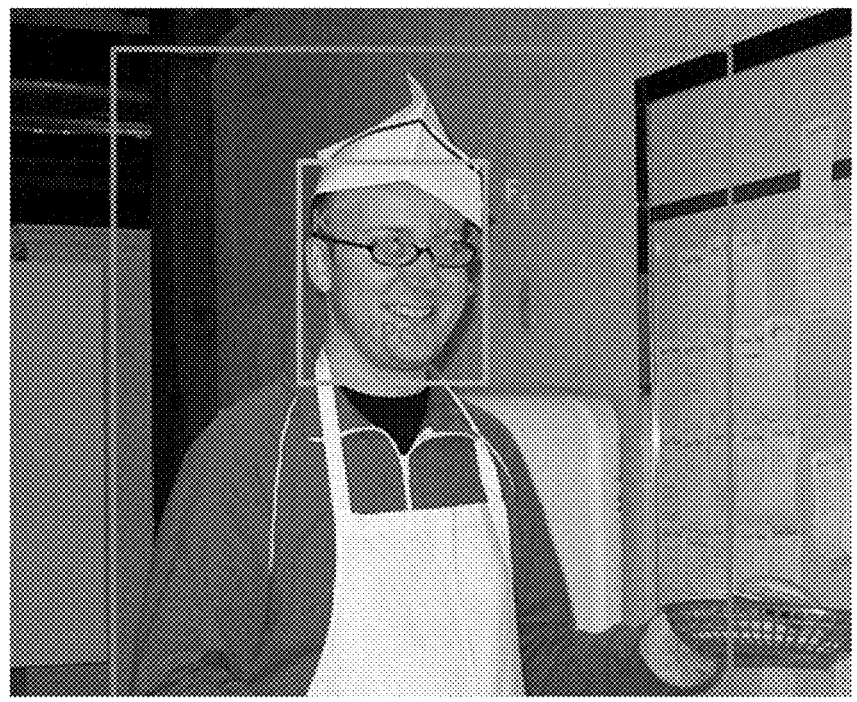
FIG. 6b represents an example of an association of items of interest in an image using an association process according to a preferred embodiment of the invention.

According to a second embodiment, in particular if three characteristic geometric structures, and in particular keypoints, are detected, the score is an overlap ratio between said box of the second item and a convex envelope of the characteristic geometric structures of said first item of interest category for the first item, i.e. a ratio based on the corresponding surfaces. FIG. 6b shows said convex three-point envelope characteristic of said first item of interest category for the first item in an image example.

The Jaccard criterion, i.e. the ratio between the intersection (of the box and the convex envelope) and the union (of the box and the convex envelope), also known as "Intersection Over Union" (IOU), can be used very advantageously.

For example, by noting $KP_{icvx}$ the convex envelope of the characteristic geometric structures for the i-th item of interest of the first category and $F_j$ the j-th item of interest of the second category, then the recovery score is given by the formula $$scIOU_{ij} = \frac{F_j \cap KP_{icvx}}{F_j \cup KP_{icvx}}.$$

Finally, in step (c) a combinatorial optimization algorithm based on the calculated recovery scores is implemented, so as to associate each item of interest of the first detected category with an item of interest of the second detected category.

By combinatorial optimization algorithm, (also known as discrete optimization), we mean an algorithm capable of finding a global solution to the association problem, i.e. to find the optimal pair combination among all possible pair combinations, optimal being understood in terms of "total cost": we can base ourselves for example on a cost expressed as $1-scIOU_{ij}$ (and generally any decreasing function: the higher the recovery score is, the lower the association cost is).

Many combinatorial optimization algorithms are well known, and the Hungarian algorithm, which is particularly adapted to the case in question, is the preferred one (alternatively, we can mention the Ford-Fulkerson algorithm for example).

Note that we can always use a "simple" optimization algorithm in which we simply associate to each item of the first category, the item of the second category for which the recovery score is maximum, although very close boxes (typical case of faces) as well as imprecisions on the detection of characteristic geometric structures can lead to association errors.

Tracking

This association process can be used in a process for tracking items of interest visible in a video consisting of a sequence of K images.

More precisely, each item of interest of a first category visible in a k-th image of said video (frame) can be associated with an item of interest of a second category different from the first category visible in the k-th image, according to the association method according to the third aspect.

The present method can be implemented in a standard way, using associations as a basis for tracking, but as explained the tracking can be distorted if a wrong association occurs.

Thus, according to a particularly preferred embodiment, the present method implements a frame-by-frame correction of associations as described in application FR1859158. Indeed, if an association for a single image can be optimal, it may be inconsistent with previous images. More precisely, an association obtained by the process according to the third aspect is assumed, and this association will be studied.

Preferably, the process is repeated iteratively for each image $k \in [\![1; K]\!]$ of the video so that continuous tracking can be performed, although it will be understood that it can only be implemented from time to time to correct associations. We will take the example of the sequence of images k and k+1, but we will naturally be able to transpose to any pair of successive images.

Computer Program Product

According to a forth and a fifth aspects, the invention relates to a computer program product comprising code instructions for the execution (in particular on the data processing means 11a, 11b, 11c, 21 of one or more servers 1a, 1b, 1c or of the terminal 2) of a method according to the first aspect of the invention relating to parameter training for a convolutional neural network, CNN, a method according to the second aspect of the invention for detecting items of interest visible in an image or a method according to the third association aspect of items of interest visible in an image; and storage means readable by computer equipment (a memory 12a, 12b, 12c, 22 of one or several servers 1a, 1b, 1c or of the terminal) on which this computer program product is located.

The invention claimed is:

1. A method for learning parameters of a convolution neural network, CNN, by data processing means (11a, 11b, 11c) of at least one server (1a, 1b, 1c), for detecting items of interest of at least a first item of interest category and a second item of interest category different from the first category such that the second category is a subpart of the first category, visible in images, from at least one image learning database wherein said items of interest of said first item of interest category are already annotated, the CNN comprising at least one encoding layer for generating a vector for representing detected items of interest, the method being characterized in that at least one characteristic geometric structure of said first item of interest category is also annotated in the images of said database, said characteristic geometric structure of the first item of interest category being also a characteristic geometric structure of the second item of interest category, said representation vector comprising, for at least said first item of interest category to be detected, at least one descriptive value of said characteristic geometric structure of said first item of interest category.

2. The method according to claim 1, wherein said representation vector comprises two position values and a visibility value of the at least one characteristic geometric structure of said first given item of interest category.

3. The method according to claim 1, wherein said characteristic geometric structure is a keypoint.

4. The method according to claim 1, wherein said representation vector comprises descriptive values of at least three characteristic geometric structures of said first item of interest category.

5. The method according to claim 1, wherein the encoding layer is a convolution layer or a fully connected layer.

6. The method according to claim 1, implemented from a plurality of image learning databases wherein said items of interest are already annotated, the CNN having a common core and a plurality of encoding layers, each specific to one of said plurality of image learning databases.

7. The method according to claim 1, wherein either the second category is the face category and the first category is the person category, or the second category is the license plate category and the first category is the vehicle category or a subcategory of the vehicle category.

8. A method for detecting items of interest visible in an image, by data processing means (21) of a terminal (2), by means of a CNN learned in accordance with the method according to claim 1, wherein the items of interest of said first category are detected, as well as, for each item of interest of the first detected category, the characteristic geometric structures of said first item of interest category, visible in said image.

9. The method according to claim 8, wherein said CNN is also for detecting items of interest of a second item of interest category different from the first category such that the second category is a subpart of the first category, said characteristic geometric structure of the first item of interest category being also a characteristic geometric structure of the second item of interest category, the method further comprising detecting items of interest of the second category.

10. A method for associating items of interest visible in an image, comprising implementing by means of data (21) processing of a terminal (2) steps of:
  (a) Detection of at least one item of interest of a first category visible in said image, at least one item of interest of a second category different from the first and, for each item of interest of the first category detected, the characteristic geometric structure or structures of said first item of interest category, visible in said image, according to the detection method according to claim 9;
  (b) For each pair of a first item of interest of the first detected category and a second item of interest of the second detected category, calculation of an overlap score between a box of said second item and the characteristic geometric structure(s) of said first item of interest category for the first item;
  (c) Implementation of a combinatorial optimization algorithm based on the calculated recovery scores so as to associate each item of interest of the first detected category with an item of interest of the second detected category.

11. The method according to claim 10, wherein said representation vector comprises descriptive values of at least three characteristic geometric structures of said first item of interest category, so as to detect in step (a), for each item of interest of the first detected category, at least three characteristic geometric structures of said first item of interest category visible in said image, said overlap score between a box of said second item and the keypoint(s) of said first item of interest category for the first item calculated in step (b) being a recovery rate, in particular the Jaccard criterion, between said box of the second item and a convex envelope of the characteristic geometric structures of said first item of interest category for the first item.

12. The method according to claim 10, wherein said optimization algorithm is the Hungarian algorithm.

13. A method for learning parameters of a convolution neural network, CNN, by data processing means (11a, 11b, 11c) of at least one server (1a, 1b, 1c), for detecting items of interest of at least a first item of interest category and a second item of interest category different from the first category such that the second category is a subpart of the first category, visible in images, from at least one image learning database wherein said items of interest of said first item of interest category are already annotated, the CNN comprising at least one encoding layer for generating a vector for representing detected items of interest, the method being characterized in that at least one characteristic geometric structure of said first item of interest category is also annotated in the images of said database, said characteristic geometric structure of the first item of interest category being also a characteristic geometric structure of the second item of interest category, said representation vector comprising, for at least said first item of interest category to be detected, at least one descriptive value of said characteristic geometric structure of said first item of interest category
  wherein a non-transitory computer readable program product comprising code instructions for the execution of said method for parameter training for a convolutional neural network, CNN, for detecting items of interest visible in an image, or associating items of interest visible in an image, when said program is executed on a computer.

14. A method for learning parameters of a convolution neural network, CNN, by data processing means (11a, 11b, 11c) of at least one server (1a, 1b, 1c), for detecting items of interest of at least a first item of interest category and a second item of interest category different from the first category such that the second category is a subpart of the first category, visible in images, from at least one image learning database wherein said items of interest of said first item of interest category are already annotated, the CNN comprising at least one encoding layer for generating a vector for representing detected items of interest, the method being characterized in that at least one characteristic geometric structure of said first item of interest category is also annotated in the images of said database, said characteristic geometric structure of the first item of interest category being also a characteristic geometric structure of the second item of interest category, said representation vector comprising, for at least said first item of interest category to be detected, at least one descriptive value of said characteristic geometric structure of said first item of interest category
  wherein a non-transitory storage means readable by computer equipment in which a computer program product comprises code instructions for the execution of said method for parameter training for a convolutional neural network, CNN, for detecting items of interest visible in an image or associating items of interest visible in an image.

* * * * *